(12) United States Patent
Johnson

(10) Patent No.: US 7,765,789 B2
(45) Date of Patent: Aug. 3, 2010

(54) APPARATUS AND METHOD FOR ASSEMBLING GAS TURBINE ENGINES

(75) Inventor: James Edward Johnson, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 900 days.

(21) Appl. No.: 11/611,592

(22) Filed: Dec. 15, 2006

(65) Prior Publication Data

US 2008/0141650 A1    Jun. 19, 2008

(51) Int. Cl.
*F02K 3/00* (2006.01)
(52) U.S. Cl. .................. 60/268; 60/226.1; 60/39.162
(58) Field of Classification Search ............. 60/226.1, 60/262, 268, 39.162
See application file for complete search history.

(56) References Cited

U.S. PATENT DOCUMENTS

| | | | | |
|---|---|---|---|---|
| 3,729,957 | A * | 5/1973 | Petrie et al. | 60/226.1 |
| 3,861,139 | A * | 1/1975 | Jones | 60/226.1 |
| 3,886,737 | A * | 6/1975 | Grieb | 60/226.1 |
| 3,903,690 | A * | 9/1975 | Jones | 60/39.08 |
| 4,010,608 | A * | 3/1977 | Simmons | 60/226.3 |
| 4,790,133 | A | 12/1988 | Suart | |
| 4,809,498 | A * | 3/1989 | Giffin et al. | 60/39.162 |
| 4,947,642 | A * | 8/1990 | Grieb et al. | 60/226.1 |
| 5,404,713 | A * | 4/1995 | Johnson | 60/204 |
| 5,809,772 | A * | 9/1998 | Giffin, III et al. | 60/226.1 |
| 6,378,293 | B1 * | 4/2002 | Care et al. | 60/226.1 |
| 6,619,030 | B1 | 9/2003 | Seda et al. | |
| 6,732,502 | B2 | 5/2004 | Seda et al. | |
| 7,096,674 | B2 * | 8/2006 | Orlando et al. | 60/782 |
| 7,363,757 | B2 * | 4/2008 | Loisy | 60/226.1 |
| 7,451,592 | B2 * | 11/2008 | Taylor et al. | 60/268 |
| 2007/0186535 | A1 * | 8/2007 | Powell et al. | 60/226.1 |
| 2008/0053105 | A1 * | 3/2008 | Appleby et al. | 60/785 |
| 2008/0141650 | A1 * | 6/2008 | Johnson | 60/39.162 |
| 2008/0148708 | A1 * | 6/2008 | Chou et al. | 60/268 |
| 2009/0000271 | A1 * | 1/2009 | Kupratis | 60/224 |

* cited by examiner

*Primary Examiner*—William H Rodríguez
(74) *Attorney, Agent, or Firm*—William Scott Andes, Esq.; Armstrong Teasdale LLP

(57) ABSTRACT

A gas turbine engine assembly is provided. The gas turbine engine assembly includes a core engine. The gas turbine engine assembly further includes a first rotor spool including a first fan assembly, an intermediate-pressure turbine, and a first shaft. The first fan assembly includes a single stage fan assembly coupled upstream from the core engine. The intermediate-pressure turbine includes a single stage turbine coupled downstream from the core engine. The first shaft extends between the first fan assembly and the intermediate-pressure turbine. The gas turbine engine assembly further includes a second rotor spool including a second fan assembly, a low-pressure turbine, and a second shaft. The second fan assembly includes a single stage fan assembly coupled upstream from the first fan assembly. The low-pressure turbine includes a single stage turbine coupled downstream from the intermediate-pressure turbine. The second shaft extends between the second fan assembly and the low-pressure turbine. A method of assembling the same is provided.

17 Claims, 4 Drawing Sheets

APPARATUS AND METHOD FOR ASSEMBLING GAS TURBINE ENGINES

BACKGROUND OF THE INVENTION

This invention relates generally to gas turbine engines and more particularly, to multi-spool gas turbine engines.

At least one known gas turbine engine includes, in serial flow arrangement, a forward fan assembly, a core driven fan assembly, a high-pressure compressor for compressing air flowing through the engine, a combustor for mixing fuel with the compressed air such that the mixture may be ignited, a high pressure turbine for providing power to the high pressure compressor, and a low pressure turbine for providing power to the fan assembly. The high-pressure compressor, combustor, and high-pressure turbine are sometimes collectively referred to as the core engine. In operation, the core engine generates combustion gases, which are discharged downstream to an intermediate and/or low pressure turbine that extracts energy therefrom for powering the forward fan assembly.

To increase engine efficiency, at least one known turbofan assembly includes a counter-rotating low-pressure turbine and an intermediate-pressure turbine that are each coupled to a counter-rotating fan assembly. More specifically, to assemble a turbofan engine assembly that includes counter-rotating low-pressure and intermediate-pressure turbines, an outer rotating spool, a rotating frame, and two concentric shafts, are installed within the turbofan engine assembly to support the counter-rotating low-pressure and intermediate-pressure turbines. However, the use of a counter-rotating low-pressure turbine increases the overall engine weight, design complexity, and/or manufacturing costs of such an engine are increased. Other known turbofan assemblies have attempted to increase the rotor speeds and/or use higher pressure ratio fans. However, such modifications have provided only limited benefits, as the addition of more fan stages to increase pressure ratios also increases the overall engine weight and costs.

BRIEF DESCRIPTION OF THE INVENTION

In one aspect, a method of assembling a turbofan engine assembly is provided. The assembly includes a core engine. The method includes coupling a first rotor spool within the engine assembly. The first rotor spool includes a first single stage fan assembly coupled upstream from the core engine, an intermediate-pressure turbine coupled downstream from the core engine, and a first shaft coupled between the first fan assembly and the intermediate-pressure turbine. The method further includes coupling a second rotor spool within the engine assembly. The second rotor spool includes a second single stage fan assembly coupled upstream from the first fan assembly, a low-pressure turbine coupled downstream from the intermediate-pressure turbine, and a second shaft coupled between the second fan assembly and the low-pressure turbine.

In a further aspect, a gas turbine engine assembly is provided. The gas turbine engine assembly includes a core engine. The gas turbine engine assembly further includes a first rotor spool including a first fan assembly, an intermediate-pressure turbine, and a first shaft. The first fan assembly includes a single stage fan assembly coupled upstream from the core engine. The intermediate-pressure turbine includes a single stage turbine coupled downstream from the core engine. The first shaft extends between the first fan assembly and the intermediate-pressure turbine. The gas turbine engine assembly further includes a second rotor spool including a second fan assembly, a low-pressure turbine, and a second shaft. The second fan assembly includes a single stage fan assembly coupled upstream from the first fan assembly. The low-pressure turbine includes a single stage turbine coupled downstream from the intermediate-pressure turbine. The second shaft extends between the second fan assembly and the low-pressure turbine. A method of assembling the same is provided.

DETAILED DESCRIPTION OF THE INVENTION

Figure 1:
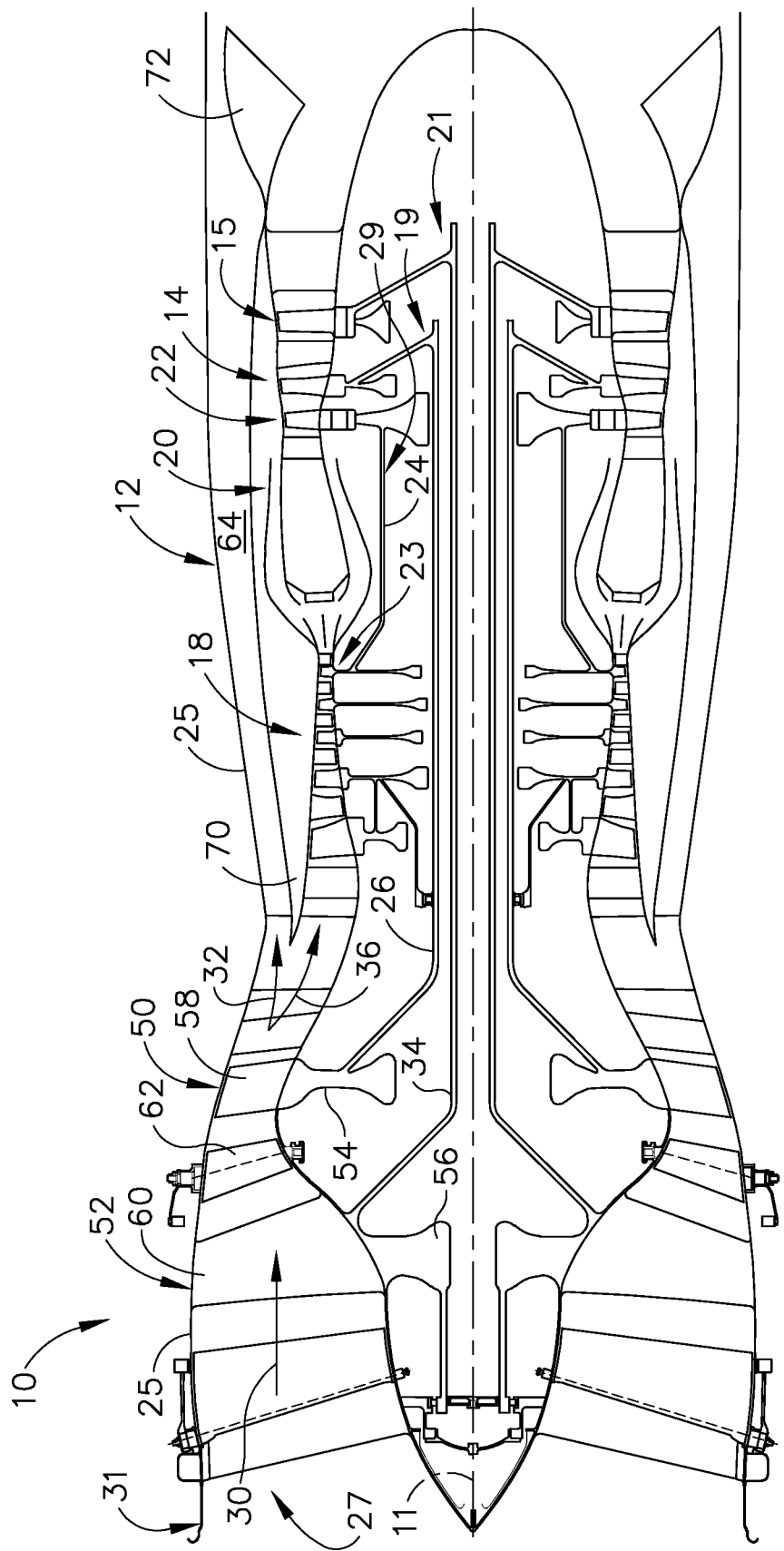
FIG. 1 is a schematic illustration of an exemplary gas turbine engine.

FIG. 1 is a cross-sectional view of an exemplary turbofan engine assembly 10 that includes a longitudinal axis 11 extending therethrough and a core gas turbine engine 12. Core gas turbine engine 12 includes a high-pressure compressor 18, a combustor 20, and a high-pressure turbine 22 that is coupled to high-pressure compressor 18 via a shaft 24. In the exemplary embodiment, high-pressure compressor 18 is an axial flow compressor and includes a rotor 23. Moreover, in the exemplary embodiment, core gas turbine engine 12 is designed to operate with a high inlet temperature and pressure.

Engine 10 also includes a first fan assembly 50, i.e. a rear fan assembly, that is coupled upstream from core gas turbine engine 12, and a second fan assembly 52, i.e. a front fan assembly, that is coupled upstream from first fan assembly 50. In the exemplary embodiment, fan assemblies 50 and 52 are each single stage fan assemblies and are each counter-rotating fan assemblies. Fan assemblies 50 and 52 each include a respective rotor disk 54 and 56, and a plurality of rotor blades 58 and 60 that are coupled to, and extend radially outward from, each respective rotor disk 54 and 56. In the exemplary embodiment, at least one stator assembly 62 is coupled between rotor blades 58 and 60.

Engine 10 also includes an intermediate-pressure turbine 14 that is coupled downstream from core gas turbine engine 12, and a low-pressure turbine 15 that is coupled downstream from intermediate-pressure turbine 14. In the exemplary embodiment, intermediate-pressure turbine 14 and low-pressure turbine 15 are each a single stage turbine. Optionally, low-pressure turbine 15 may have any number of stages. Moreover, in the exemplary embodiment, turbines 14 and 15 are each coupled downstream from core gas turbine engine 12. Specifically, in the exemplary embodiment, intermediate-pressure turbine 14 is rotably coupled to high-pressure turbine 22 without any stator assembly being coupled between turbines 14 and 22, as counter-rotating fan assemblies 50 and 52 eliminate the need for a stator assembly to be coupled between immediate-pressure turbine 14 and high-pressure turbine 22.

In the exemplary embodiment, engine 10 is a three-spool engine. Alternatively, turbofan engine assembly 10 is a multi-spool engine including any number of spools. More specifically, engine 10 includes a first rotor spool 19 including fan assembly 50, intermediate-pressure turbine 14, and a first shaft 26 extending between fan assembly 50 and turbine 14 through core gas turbine engine 12. Engine 10 also includes a second rotor spool 21 including fan assembly 52, low-pressure turbine 15, and a second shaft 34 extending between fan assembly 52 and turbine 15 through core gas turbine engine 12. Moreover, in the exemplary embodiment, second shaft 34 is concentrically aligned with first shaft 26. In the exemplary embodiment, engine 10 also includes a third rotor spool 29 including high-pressure compressor 18, high-pressure turbine 22, and shaft 24 extending between compressor 18 and turbine 22. In the exemplary embodiment, third shaft 24 is concentrically aligned with first and second shafts 26 and 34.

Engine 10 also includes an outer casing or nacelle 25 that circumscribes fan assemblies 50 and 52, core engine 12, and turbines 14 and 15. An upstream end 31 of outer casing 25 defines an inlet 27 that is sized to provide airflow to engine 10. In the exemplary embodiment, gas turbine engine 10 also includes an outer bypass duct 64 that is radially inward of outer casing 25 and circumscribes core gas turbine engine 12, and turbines 14, 15, and 22. Outer bypass duct 64, as described in more detail below, enables a portion of airflow discharged from fan 50 to bypass around core engine 12 and turbines 14, 15, and 22.

Engine 10 also includes a splitter 70 that is coupled downstream from fan assemblies 50 and 52 and is coupled upstream from compressor 18. Engine 10 also includes a variable area bypass injector (VABI) 72 coupled downstream from turbines 14, 15, and 22. VABI 72 is coupled to an on-board control system (not shown). In the exemplary embodiment, VABI 72 facilitates regulating the pressure and the quantity of airflow that is channeled from outer bypass duct 64.

During operation, air 30 channeled through inlet 27 is compressed by fan assembly 52 and is channeled downstream through stator assembly 62 towards fan assembly 50. Air 30 compressed by fan assembly 50 is separated by splitter 70 into a plurality of flowpaths 32, 36. Specifically, a first portion 32 of air is channeled through outer bypass duct 64 downstream towards VABI 72.

Air 36 is further compressed by compressor 18. The compressed air 36 is then discharged from compressor 18 towards combustor 20 wherein injected fuel is mixed with the air 36 and is ignited to provide high-energy combustion gases used to induce rotation of core engine turbine 22. Turbine 22, in turn, drives rotor 23 through shaft 24. In the exemplary embodiment, shaft 24 rotates in a first direction, i.e. a clockwise direction. The combustion gases are then channeled towards intermediate-pressure turbine 14, which, in turn, drives single stage fan assembly 50 through shaft 26. Air 36 discharged from high-pressure turbine 22 is discharged towards intermediate-pressure turbine 14 without being channeled through a stator assembly. In the exemplary embodiment, shaft 26 rotates in a second direction, i.e. a counter-clockwise direction, that is opposite of the first direction. When air 36 is discharged from high-pressure turbine 22, air 36 directly contacts intermediate-pressure turbine 14 such that intermediate-pressure turbine 14 rotates in a direction opposite of high-pressure turbine 22. Air 36 discharged from intermediate-pressure turbine 14 induces rotation of low-pressure turbine 15, which, in turn, drives fan assembly 52 through shaft 34. In the exemplary embodiment, shaft 34 also rotates in the first direction, i.e. a clockwise direction.

In the exemplary embodiment, shaft 34 rotates fan assembly 52 at a first speed, and shaft 26 rotates fan assembly 50 at a second speed that is faster than the rotational speed of fan assembly 52. In an alternative embodiment, shaft 26 may rotate fan assembly 50 at any suitable speed that enables engine 10 to function as described herein. In the exemplary embodiment, fan assemblies 50 and 52 are designed to produce a potential high pressure ratio of approximately 7:1. Moreover, in the exemplary embodiment, shafts 26 and 34 have corrected rotational speeds in the 1700 fps class. If fan assemblies 50 and 52 were coupled via a single shaft as is common in known engines, the corrected speed of fan assembly 50 would be approximately 20% lower as a result of the temperature rise across fan assembly 52 which would negatively impact the potential pressure ratio capabilities of fan assembly 50.

Figure 2:
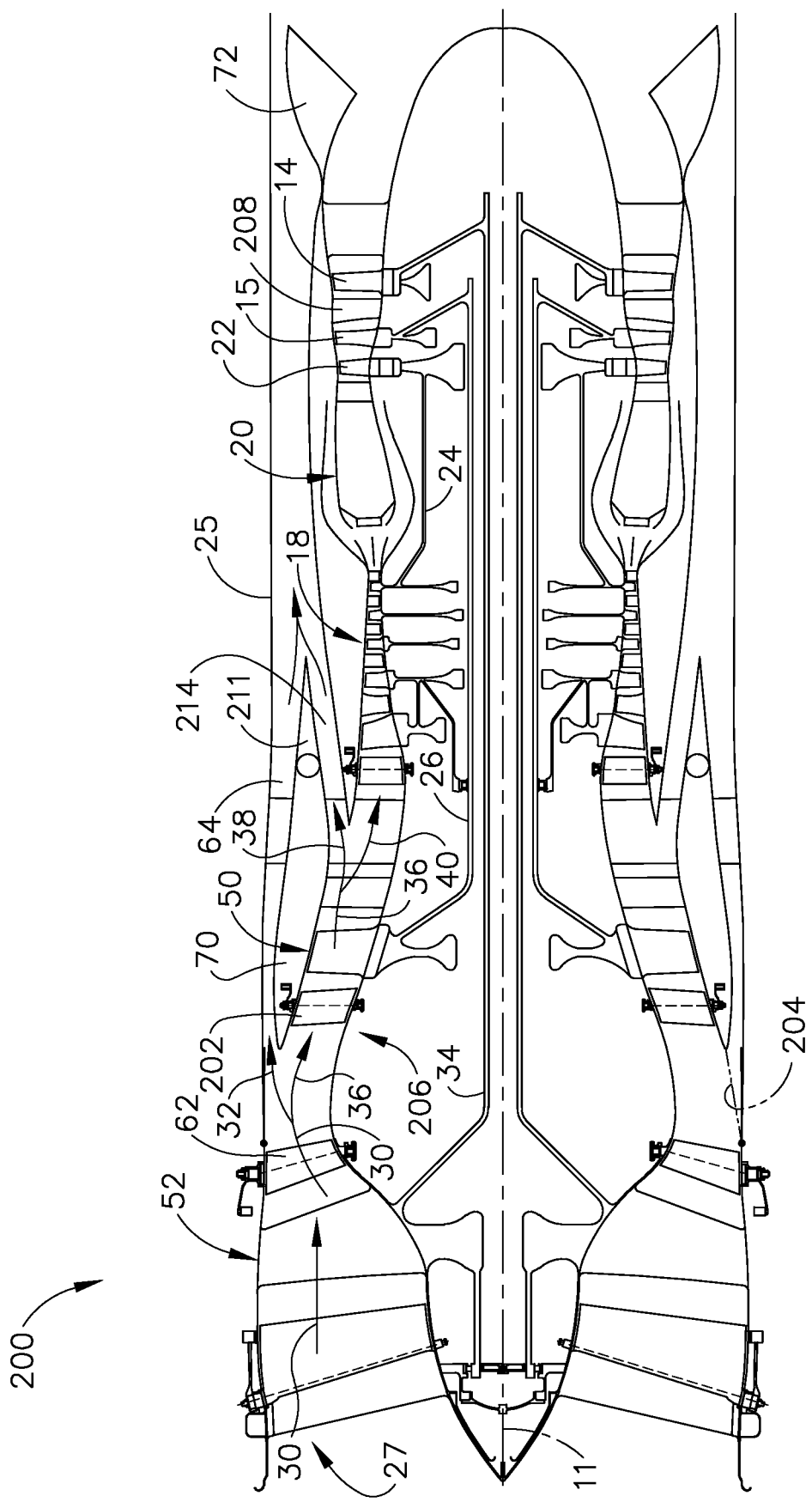
FIG. 2 is a schematic illustration of an alternative embodiment of the gas turbine engine shown in FIG. 1.

FIG. 2 is a cross-sectional illustration of an alternative embodiment of a gas turbine engine 200. Engine 200 is substantially similar to engine 10, and as such, components of FIG. 2 that are identical to components of FIG. 1 are referenced in FIG. 2 using the same reference numerals used in FIG. 1. Engine 200 is a three-spool engine that includes fan assemblies 50 and 52, compressor 18, high-pressure turbine 22, intermediate-pressure turbine 14, and low-pressure turbine 15.

Engine 200 also includes a splitter 70 that is coupled between fan assemblies 50 and 52 and is coupled upstream from compressor 18. As such, splitter 70, in conjunction with variable stator 202, and bypass selector valve 204, separates air 30 compressed by fan assembly 52 into a plurality of flowpaths 32, 36. Engine 200 further includes a splitter 71 that is coupled between fan assembly 50 and compressor 18. As such, splitter 71 separates air 36 compressed by fan assembly 50 into a plurality of flowpaths 38, 40.

Engine 200 also includes performance enhancing variable cycle features, such as variable stator 202 and a bypass selector valve 204 that are positioned between fan assembly 50 and fan assembly 52 to selectively control air flow through engine 200. Valve 204 is selectively operable between a first operational position, i.e. a closed position, and a second operational position, i.e. an open position. As such, valve 204 separates air 36 compressed by fan assembly 50 into flowpaths 32, 36.

Engine 200 also includes a variable area bypass injector (VABI) 72 coupled downstream from turbines 14, 15, and 22. VABI 72 is coupled to an on-board control system (not shown), for example, a FADEC. In the exemplary embodiment, VABI 72 facilitates regulating the pressure and quantity of airflow that is channeled from outer bypass duct 64. In the exemplary embodiment, engine 200 includes a forward variable area bypass injector (VABI) 211 coupled downstream from splitter 70 and upstream from compressor 18. VABI 211 is also coupled to an on-board control system (not shown), for example, a FADEC. In the exemplary embodiment, VABI 211 facilitates regulating the pressure and quantity of airflow that is channeled through flowpath 32. Engine 200 also includes a forward variable inlet guide vane (IGV) 208 coupled between intermediate-pressure turbine 14 and low-pressure turbine 15. IGV 208 provides additional speed control of rotor 34 during engine operation.

Gas turbine engine 200 includes outer bypass duct 64 that extends radially inward of outer bypass duct 64 to enable a portion of airflow 32 discharged from fan 52 to bypass core engine 12. In the exemplary embodiment, outer bypass duct 64 substantially circumscribes core gas turbine engine 12.

During operation, air 30 channeled through inlet 27 is compressed by fan assembly 52 and is channeled downstream through stator assembly 62 towards IGV 202. Valve 204 is selectively operable between the first operational position and second operational position. If IGV 202 is open, valve 204 is closed or in the first operational position, air flows downstream from fan assembly 52 through stator assembly 62 and into fan assembly 50. If IGV 202 is closed, valve 204 is open or in the second operational position, air 30 flows downstream from fan assembly 52 through stator assembly 62 and is separated into flowpaths 32, 36. Specifically, a first portion 32 of the airflow is channeled through outer bypass duct 64 towards VABI 72, and a second portion 36 of the airflow is channeled through fan assembly 50.

In the exemplary embodiment, the second portion 36 of airflow exits fan 50 and is separated into two flowpaths 38 and 40 by splitter 71. Specifically, a first portion 38 of the airflow is channeled through a duct 214 that is between VABI 211 and core engine 12, i.e. duct 214 is radially inward of VABI 211 and radially outward of core engine 12. First portion 38 of the airflow is channeled through duct 214 and merges with flow 32 downstream of VABI 211 at a mixing plane. The remaining airflow 40 is channeled into axial flow compressor 18 where it is highly compressed. The compressed air is then discharged to combustor 20 wherein fuel is injected and the resulting fuel-air mixture is ignited to provide combustion gases that impart rotation of core engine turbine 22. Turbine 22, in turn, drives rotor 23 through shaft 24. Shaft 24 rotates in a first direction, i.e. a clockwise direction. The combustion gases are then channeled towards intermediate-pressure turbine 14, which, in turn, drives single stage fan assembly 50 through shaft 26. In the exemplary embodiment, shaft 26 rotates in a second direction, i.e. a counter-clockwise direction that is opposite of the first direction. Air 40 discharged from intermediate-pressure turbine 14 contacts low-pressure turbine 15 without being channeled through a stator assembly. Air 40 induces rotation of low-pressure turbine 15, which, in turn, drives fan assembly 52 through shaft 34. In the exemplary embodiment, shaft 34 also rotates in the first direction, i.e. a clockwise direction. Moreover, in the exemplary embodiment, fan assemblies 50 and 52 of engine 200 are designed to produce a potential overall ratio in the 7+ class. Alternatively, fan assemblies 50 and 52 can be designed to provide other levels of overall fan pressure ratio.

Figure 3:
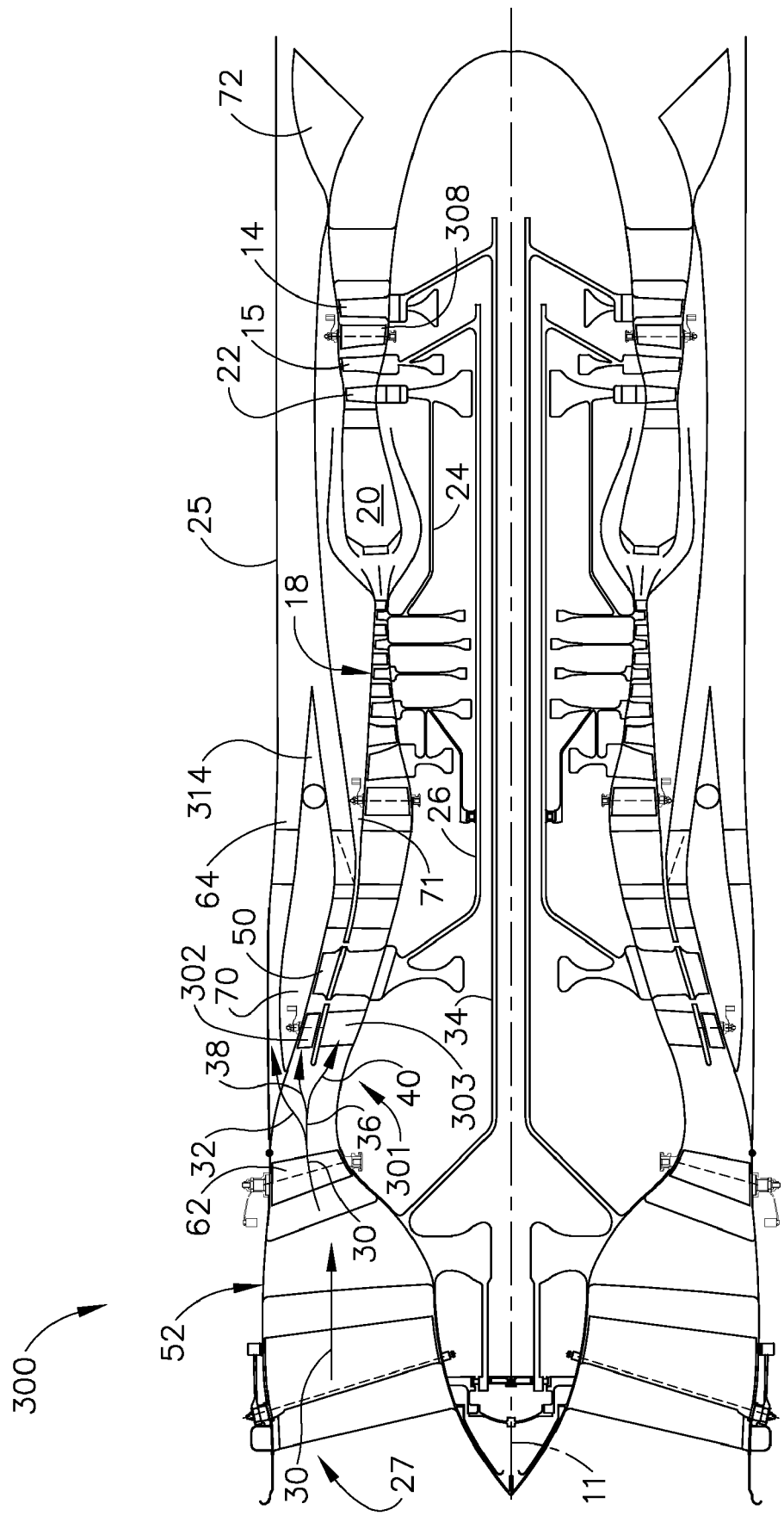
FIG. 3 is a schematic illustration of another alternative embodiment of the gas turbine engine shown in FIG. 1.

FIG. 3 is a cross-sectional illustration of a further alternative embodiment of gas turbine engine 300. Engine 300 is substantially similar to engine 200, and as such, components of FIG. 3 that are identical to components of FIG. 2 are referenced in FIG. 3 using the same reference numerals used in FIG. 2. Engine 300 is a three-spool engine that includes fan assemblies 50 and 52, compressor 18, high-pressure turbine 22, intermediate-pressure turbine 14, and low-pressure turbine 15. Engine 300 also includes a splitter 70 that is coupled between fan assemblies 50 and 52 and is coupled upstream from compressor 18. As such, splitter 70 separates air 30 compressed by fan assembly 52 into a plurality of flowpaths 32, 36. Engine 200 further includes a splitter 71 that is coupled between fan assembly 50 and compressor 18.

Engine 300 also includes a variable inlet guide vane (IGV) 308 that is coupled between intermediate-pressure turbine 14 and low-pressure turbine 15. IGV 308 allows more flexibility in front fan operation during off-design operation. In the exemplary embodiment, engine 300 includes a forward variable area bypass injector (VABI) 314. In an alternative embodiment, low-pressure turbine 15 includes a variable stator that facilitates enhancing cycle features of engine 300. Specifically, a splittered rotor 301 is coupled between fan assembly 52 and fan assembly 50 and is radially inward from splitter 70. In the exemplary embodiment, rotor 301 includes an independent tip and hub inlet guide vane (IGV) 302 and 303, respectively. Moreover, in the exemplary embodiment, IGV 303 is variably positionable to selectively control air flow through engine 300. As such, IGV 303 separates air 36 into a plurality of flowpaths 38, 40.

Gas turbine engine 300 includes outer bypass duct 64. Engine 10 also includes a variable area bypass injector (VABI) 72 coupled downstream from turbines 14, 15, and 22. VABI 72 is coupled to an on-board control system (not shown), for example, a FADEC. In the exemplary embodiment, VABI 72 facilitates regulating the pressure and quantity of airflow that is channeled from outer bypass duct 64. In the exemplary embodiment, engine 300 includes a forward variable area bypass injector (VABI) 314 coupled downstream from splitter 70 and upstream from compressor 18. VABI 314 is also coupled to an on-board control system (not shown), for example, a FADEC. In the exemplary embodiment, VABI 314 facilitates regulating the pressure and quantity of airflow that is channeled through flowpath 32. Engine 300 also includes a forward variable inlet guide vane (IGV) 308 coupled between intermediate-pressure turbine 14 and low-pressure turbine 15.

During operation, air channeled through core engine inlet duct 27 is compressed by fan assembly 52 and is channeled downstream through stator assembly 62. Air discharged from stator assembly 62 is split into flowpaths 32, 36 by splitter 70 and IGV 303. Specifically, a first portion 32 of airflow is channeled through outer bypass duct 64 towards variable area bypass injector (VABI) 72. A second portion 36 of airflow is channeled through rotor 301. Specifically, rotor 301 splits second portion 36 into flowpaths 38, 40. A first portion 38 is channeled downstream through tip IGV 302, through fan assembly 50, and merges with flow 32 downstream of VABI 314 at a mixing plane.

The remaining airflow 40 is channeled through IGV 303, through fan assembly 50, and is directed into axial flow compressor 18 where it is highly compressed. The compressed air is then discharged to combustor 20 wherein fuel is injected and the resulting fuel-air mixture is ignited to provide combustion gases that impart rotation of core engine turbine 22. Turbine 22, in turn, drives rotor 23 through shaft 24. Shaft 24 rotates in a first direction, i.e. a clockwise direction. The combustion gases are then channeled towards intermediate-pressure turbine 14, which, in turn, drives single stage fan assembly 50 through shaft 26. In the exemplary embodiment, shaft 26 rotates in a second direction, i.e. a counter-clockwise direction that is opposite of the first direction. Air 40 discharged from high-pressure turbine 22 contacts intermediate-pressure turbine 15 without being channeled through a stator assembly. Air 40 passes through low-pressure turbine 14, which, in turn, drives fan assembly 52 through shaft 34. In the exemplary embodiment, shaft 34 also rotates in the first direction, i.e. a clockwise direction. Moreover, in the exemplary embodiment, fan assemblies 50 and 52 of engine 200 are designed to produce a potential overall pressure ratio in the 7:1 class. Alternatively, fan assemblies 50 and 52 can be designed to produce other levels of overall fan pressure ratio.

Figure 4:
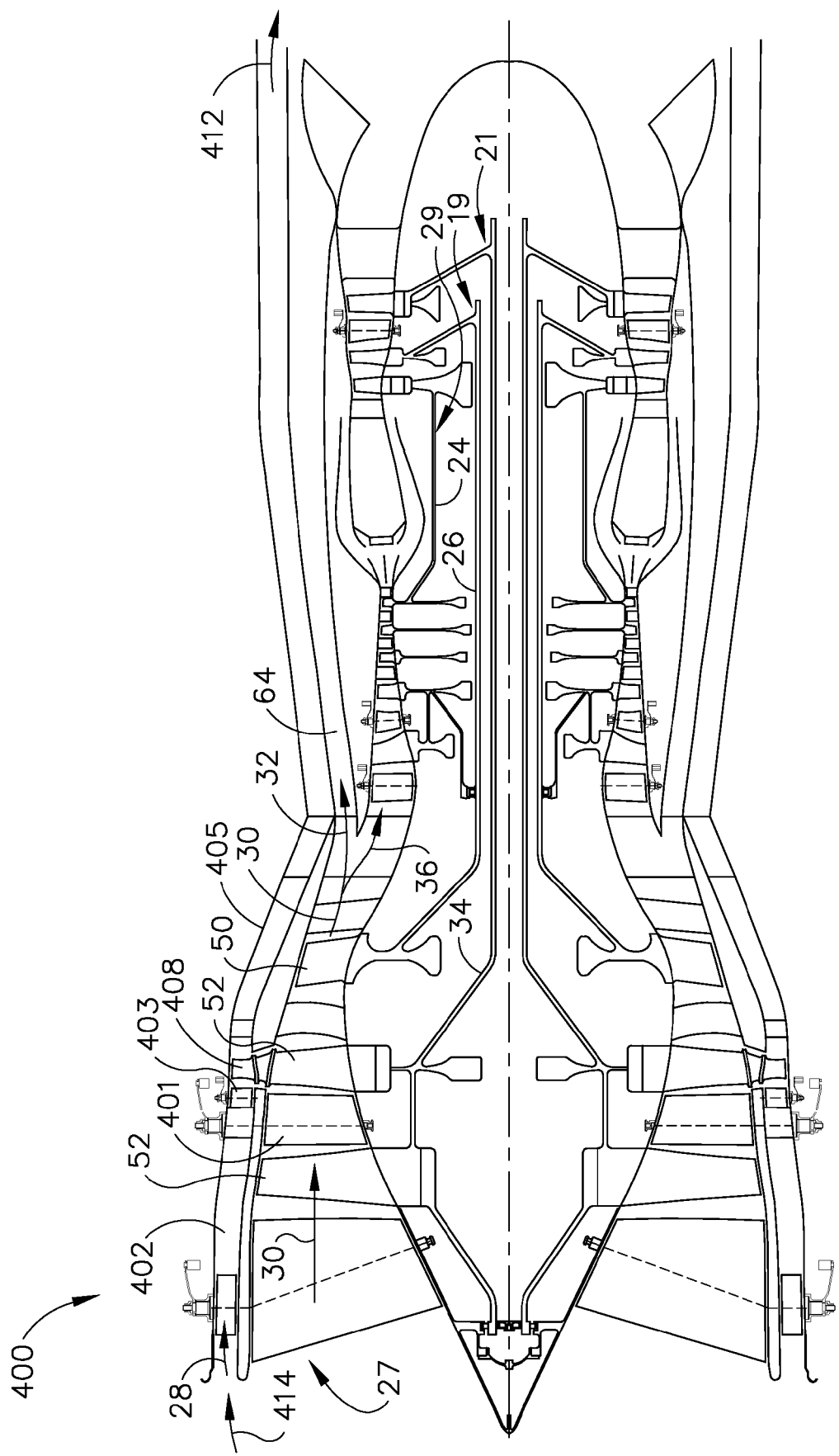
FIG. 4 is a schematic illustration of a further alternative embodiment of the gas turbine engine shown in FIG. 1.

FIG. 4 is a schematic illustration of another alternative embodiment gas turbine engine 400. Engine 400 is substantially similar to engine 10, and as such, components of FIG. 4 that are identical to components of FIG. 1 are referenced in FIG. 4 using the same reference numerals used in FIG. 1. Engine 400 is a three-spool engine that includes fan assembly 50, a two-stage fan assembly 52, and a third fladed fan assembly 408 that is coupled to fan assembly 52. Engine 400 also includes compressor 18, high-pressure turbine 22, intermediate-pressure turbine 14, and low-pressure turbine 15.

Engine 400 includes a first rotor spool 19 including fan assembly 50, intermediate-pressure turbine 14, and first shaft 26, and a second rotor spool 21 including fan assembly 52, low-pressure turbine 15, and second shaft 34. In the exemplary embodiment, shafts 26 and 34 extend through core gas turbine engine 12. Moreover, in the exemplary embodiment, second shaft 34 is concentrically aligned with first shaft 26.

Engine 400 also includes a third rotor spool 29 that includes high-pressure compressor 18, high-pressure turbine 22, and shaft 24. In the exemplary embodiment, third shaft 24 is concentrically aligned with first and second shafts 26 and 34, respectively.

Engine 400 also includes an inlet guide vane 401 located in front of fan assembly 408. In the exemplary embodiment, IGV 401 is variably positionable to selectively control air flow through engine 400. Flade duct 402 extends through a gap defined between casing 25 and a flade casing 405 that is radially outward of casing 25. Duct 402 includes a duct inlet 414, an inlet guide vane (IGV) 403 coupled downstream from duct inlet 414, and a plurality of flade rotor blades 408 coupled downstream from IGV 403 and radially outward from fan assemblies 50, 52, and 404. Flades 408 facilitate increasing the thrust and efficiency of engine 400 and supplies cooling air for a secondary nozzle system. In the exemplary embodiment, IGV 403 is variably positionable to selectively control air flow through flade duct 402.

During operation, a first portion 28 of airflow is channeled into duct 402 through duct inlet 414 downstream through flades 408 wherein the airflow is compressed prior to being discharged through an outlet 412 of flade duct 402 to facilitate increasing thrust from engine 400.

A second portion 30 of airflow is channeled through inlet duct 27 and flows through IGV 401. Air 30 discharged from fan assembly 52 is channeled through stator assembly 62 towards fan assembly 50. Fan assembly 50 compresses air 30 and splitter 70 separates air 30 into a plurality of flowpaths 32, 36. Specifically, a first portion 32 of the airflow is channeled through outer bypass duct 64 towards VABI 72.

A second portion 36 is channeled into compressor 18. The compressed air 36 is then discharged from compressor 18 towards combustor 20 wherein injected fuel is mixed with the air 36 and is ignited to provide high-energy combustion gases used to induce rotation of core engine turbine 22. Turbine 22, in turn, drives rotor 23 through shaft 24. In the exemplary embodiment, shaft 24 rotates in a first direction, i.e. a clockwise direction. The combustion gases are then channeled towards intermediate-pressure turbine 14, which, in turn, drives single stage fan assembly 50 through shaft 26. Air 36 discharged from high-pressure turbine 22 is discharged towards intermediate-pressure turbine 14 without being channeled through a stator assembly. In the exemplary embodiment, shaft 26 rotates in a second direction, i.e. a counter-clockwise direction, that is opposite of the first direction. When air 36 is discharged from high-pressure turbine 22, air 36 directly contacts intermediate-pressure turbine 14 such that intermediate-pressure turbine 14 rotates in a direction opposite of high-pressure turbine 22. Air 36 discharged from intermediate-pressure turbine 14 induces rotation of low-pressure turbine 15, which, in turn, drives fan assembly 52 through shaft 34. In the exemplary embodiment, shaft 34 also rotates in the first direction, i.e. a clockwise direction.

In the exemplary embodiment, shaft 34 rotates fan assembly 52 at a first speed, and shaft 26 rotates fan assembly 50 at a second speed that is faster than the rotational speed of fan assembly 52. In an alternative embodiment, shaft 26 may rotate fan assembly 50 at any suitable speed that enables engine 10 to function as described herein. In the exemplary embodiment, fan assembly 50 and fan assembly 52 are designed to produce a potential overall pressure ratio of approximately 7:1.

The method herein includes a method of assembling a turbofan engine assembly. The assembly includes a core engine. The method includes coupling a first rotor spool within the engine assembly. The first rotor spool includes a first single stage fan assembly coupled upstream from the core engine, an intermediate-pressure turbine coupled downstream from the core engine, and a first shaft coupled between the first fan assembly and the intermediate-pressure turbine. The method further includes coupling a second rotor spool within the engine assembly. The second rotor spool includes a second single stage fan assembly coupled upstream from the first fan assembly, a low-pressure turbine coupled downstream from the intermediate-pressure turbine, and a second shaft coupled between the second fan assembly and the low-pressure turbine.

The above-described engine assemblies provide increased overall fan pressure ratios in the 7:1 class while utilizing a minimum number of fan and turbine stages. With a minimum number of fan and turbine stages, the above-described invention maintains low-pressure turbine loads and engine weight. Also, the invention described herein achieves high pressure ratios without increasing the length of engine. The engine assemblies described herein provide significantly increased pressure ratios such that the engine efficiency is increased without excessive cost.

An exemplary embodiment of an engine assembly is described above in detail. The engine assemblies illustrated are not limited to the specific embodiments described herein, but rather, components of each assembly may be utilized independently and separately from other components described herein.

While the invention has been described in terms of various specific embodiments, those skilled in the art will recognize that the invention can be practiced with modification within the spirit and scope of the claims.

What is claimed is:

1. A method of assembling a turbofan engine assembly including a core engine, said method comprising:
    coupling a first rotor spool within the engine assembly, wherein the first rotor spool includes a first single stage fan assembly coupled upstream from the core engine, an intermediate-pressure turbine coupled downstream from the core engine, and a first shaft coupled between the first fan assembly and the intermediate-pressure turbine;
    coupling a second rotor spool within the engine assembly, wherein the second rotor spool includes a second single stage fan assembly coupled upstream from the first fan assembly, a low-pressure turbine coupled downstream from the intermediate-pressure turbine, and a second shaft coupled between the second fan assembly and the low-pressure turbine; and
    coupling a stator vane assembly between the first single stage fan assembly and the second single stage fan assembly.

2. A method in accordance with claim 1 wherein the core engine includes a compressor, a high-pressure turbine, and a third shaft extending therebetween, said coupling a second rotor spool comprises aligning the first shaft and second shaft with the third shaft.

3. A method in accordance with claim 1 further comprising coupling the high-pressure turbine to the intermediate-pressure turbine such that airflow discharged from the high-pressure turbine is directed against the intermediate-pressure turbine without being channeled through a stator assembly.

4. A method in accordance with claim 1 wherein said method further comprising coupling a variable inlet guide vane between the intermediate-pressure turbine and the low-pressure turbine.

5. A gas turbine engine assembly comprising:
    a core engine;

a first rotor spool comprising a first fan assembly, an intermediate-pressure turbine, and a first shaft, said first fan assembly comprising a single stage fan assembly coupled upstream from said core engine, said intermediate-pressure turbine comprising a single stage turbine coupled downstream from said core engine, said first shaft extending between said first fan assembly and said intermediate-pressure turbine;

a second rotor spool comprising a second fan assembly, a low-pressure turbine, and a second shaft, said second fan assembly comprising a single stage fan assembly coupled upstream from said first fan assembly, said low-pressure turbine comprising a single stage turbine coupled downstream from said intermediate-pressure turbine, said second shaft extending between said second fan assembly and said low-pressure turbine; and a stator vane assembly coupled between said first single stage fan assembly and said second single stage fan assembly, wherein said first spool rotates in a first rotational direction and said second spool rotates in an opposite rotational direction.

6. A gas turbine engine in accordance with claim 5 wherein said first spool rotates at a first rotational speed and said second spool rotates at a second rotational speed that is slower than the first rotational speed.

7. A gas turbine engine in accordance with claim 5 wherein said core engine comprises a compressor and a high-pressure turbine coupled between said compressor and said intermediate-pressure turbine, said high-pressure turbine is immediately coupled to said intermediate-pressure turbine such that airflow discharged from said high-pressure turbine is directed against said intermediate-pressure turbine without being channeled through a stator assembly.

8. A gas turbine engine in accordance with claim 5 wherein said core engine comprises a third rotor spool comprising a compressor, a high-pressure turbine, and a third shaft, said third shaft extends between said compressor and said high-pressure turbine.

9. A gas turbine engine in accordance with claim 8 wherein said first shaft and said second shaft extend through said core engine, said second shaft is concentrically aligned with said first shaft.

10. A gas turbine engine in accordance with claim 8 wherein said third rotor shaft is concentrically aligned with said first and second shafts.

11. A gas turbine engine in accordance with claim 5 wherein said gas turbine engine further comprises a valve assembly coupled between said first and second fan assemblies, and a splitter coupled downstream from said second fan assembly, and upstream from a radially inner duct and a radially outer duct, said valve assembly is selectively operable to channel airflow through said radially inner and outer ducts.

12. A gas turbine engine in accordance with claim 11 wherein said gas turbine engine further comprises a front variable bypass injector coupled downstream from said splitter.

13. A gas turbine engine in accordance with claim 5 wherein said gas turbine engine further comprises a rear variable area bypass injector coupled downstream from said intermediate and low-pressure turbines.

14. A gas turbine engine in accordance with claim 5 wherein said gas turbine engine further comprises a splitter coupled downstream from said second fan assembly, said splitter is upstream from a radially inner duct and a radially outer duct, said radially inner duct comprises a splittered rotor therein.

15. A gas turbine engine in accordance with claim 5 wherein said gas turbine engine further comprises a variable inlet guide vane coupled between said intermediate and low-pressure turbines.

16. A gas turbine engine in accordance with claim 5 wherein said gas turbine engine further comprises a flade duct circumscribing said core engine, said flade duct comprises at least one flade coupled to at least one of said first and second fan assemblies.

17. A gas turbine engine in accordance with claim 5 wherein said gas turbine engine further comprises a third single stage fan assembly coupled upstream from said second fan assembly, said first shaft extends between said intermediate-pressure turbine, said first fan assembly, and said third fan assembly.

* * * * *